(12) United States Patent
Fukawa et al.

(10) Patent No.: US 7,008,093 B2
(45) Date of Patent: Mar. 7, 2006

(54) HEADLAMP FOR VEHICLE

(75) Inventors: Kiyotaka Fukawa, Shizuoka (JP); Tomoyuki Moritani, Shizuoka (JP); Masahito Naganawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 106 days.

(21) Appl. No.: 10/829,910

(22) Filed: Apr. 22, 2004

(65) Prior Publication Data

US 2004/0213012 A1 Oct. 28, 2004

(30) Foreign Application Priority Data

Apr. 23, 2003 (JP) .......................... P. 2003-119129

(51) Int. Cl.
*B60Q 1/06* (2006.01)
*F21V 14/08* (2006.01)

(52) U.S. Cl. ...................... 362/539; 362/284; 362/324; 362/464; 362/512; 362/523

(58) Field of Classification Search ................ 362/539, 362/523, 512, 464
See application file for complete search history.

(56) References Cited

U.S. PATENT DOCUMENTS 5,707,129 A * 1/1998 Kobayashi .................. 362/464
6,309,094 B1 * 10/2001 Woerner ..................... 362/539
6,457,849 B1 * 10/2002 Tsukamoto ................. 362/509
6,457,851 B1 * 10/2002 Hamm ....................... 362/525
6,837,601 B1 * 1/2005 Tatsukawa .................. 362/512
6,848,814 B1 * 2/2005 Watanabe et al. ........... 362/465
2001/0040810 A1 11/2001 Kusagaya ................... 362/351

FOREIGN PATENT DOCUMENTS

JP 2001-325816 11/2001

* cited by examiner

*Primary Examiner*—Alan Cariaso
(74) *Attorney, Agent, or Firm*—Fish & Richardson P.C.

(57) ABSTRACT

A first shade 32 is properly moved to vertically shift the position of a cutoff line, and furthermore, a lighting unit 20 is properly tilted in a vertical direction to displace a whole light distribution pattern in the vertical direction. Consequently, a light irradiation is carried out with a light distribution pattern at an irradiation angle corresponding to a vehicle traveling situation. In that case, a second shade 34 is properly moved to form a dark portion in a central part on the lower end of the light distribution pattern in a predetermined size if necessary. Consequently, the amount of a light irradiation on a short-distance region can be controlled finely, and a road surface on this side can be prevented from becoming too bright in a high-speed travel and a light reflected by the road surface which causes a glare can be prevented from being generated in a rain travel.

9 Claims, 5 Drawing Sheets

HEADLAMP FOR VEHICLE

BACKGROUND OF THE INVENTION

The present invention relates to a headlamp for a vehicle which is constituted to form a light distribution pattern having a cutoff line on an upper end by a so-called projector type lighting unit.

Conventionally, there has been known a headlamp for a vehicle which is constituted to irradiate a light forward from the vehicle by a projector type lighting unit.

The projector type lighting unit is constituted to collect and reflect a light emitted from a light source provided in the vicinity of an optical axis extended in the longitudinal direction of the vehicle forward from a reflector close to the optical axis and to irradiate the reflected light forward from the lighting unit through a projection lens provided in the forward part of the reflector. In the case in which a light distribution pattern having a cutoff line is to be formed on an upper end by the lighting unit, a shade is provided between the projection lens and the reflector, to shield a part of a light reflected from the reflector through the shade, thereby forming a cutoff line.

JP-A-2001-325816 discloses a headlamp for a vehicle having such a structure that a shade is moved to vertically shift the position of the cutoff line of the light distribution pattern and to tilt a lighting unit in a vertical direction, thereby displacing the whole light distribution pattern in the vertical direction corresponding to a vehicle traveling situation.

By employing the structure described in JP-A-2001-325816, it is possible to irradiate a light with a light distribution pattern at an irradiation angle corresponding to a vehicle traveling situation. Consequently, it is possible to enhance the visibility of a road surface in the forward portion of the vehicle.

However, in such a case, the shape of the lower end of a light distribution pattern is maintained to be constant. Therefore, there is a problem in that the amount of a light irradiation on the short-distance region of the road surface in the forward portion of the vehicle cannot be controlled finely.

SUMMARY OF THE INVENTION

In consideration of such circumstances, it is an object of the invention to provide a headlamp for a vehicle which is constituted to form a light distribution pattern having a cutoff line on an upper end by a projector type lighting unit, wherein a light irradiation can be carried out with a light distribution pattern at an irradiation angle corresponding to a vehicle traveling situation, and furthermore, the amount of the light irradiation on the short-distance region of the road surface in the forward portion of the vehicle can also be controlled finely.

The object can be achieved by a headlamp according to the present invention comprising: a lighting unit including: a light source disposed on a vicinity of an optical axis extended in a longitudinal direction of the vehicle; a reflector for collecting a light emitted from the light source and reflecting the collected light forward close to the optical axis; and a shade disposed in front of the reflector for shielding a part of a light reflected from the reflector, wherein a cutoff line is formed in a light distribution pattern on an upper end, wherein the shade includes: a first shade for forming the cutoff line; and a second shade for forming a dark portion in a central part on a lower end of the light distribution pattern, the first shade moves to change an amount of shielding of the reflected light by the first shade according to a vehicle traveling situation, and the second shade moves to change an amount of shielding of the reflected light by the second shade according to the vehicle traveling situation, and the lighting unit is tilted in a vertical direction interlockingly with the movement of at least one of the first and second shade according to the vehicle traveling situation.

The "disposed on a vicinity of an optical axis extended in a longitudinal direction of the vehicle" is a concept including a manner of arrangement in a slightly shifted position from the optical axis, in addition to a manner of accurate arrangement on the optical axis.

The type of the "light source" is not particularly restricted but a discharge light emitting section of a discharge bulb and a filament of a halogen bulb can be employed, for example.

The specific shape of the "cutoff line" is not particularly restricted, if the "cutoff line" is formed on the upper end of the light distribution pattern.

The "vehicle traveling situation" implies various state amounts and external information related to a vehicle travel, and a vehicle speed, a steering angle, a vehicle posture, a distance from a forward traveling car, a weather and navigation information correspond thereto, for example.

The manners of the movements of the "first shade" and the "second shade" are not particularly restricted but a straight reciprocation or a rotation can be employed, for example.

Furthermore, it is more preferable that, in the headlamp, when the vehicle is in a high-speed travel, the first shade moves in such a direction as to decrease the amount of shielding of the reflected light, the second shade moves in such a direction as to increase the amount of shielding of the reflected light, and the lighting unit is tilted upward, as compared with a normal travel.

Further, it is more preferable that, when the vehicle is in a rain travel, the first shade moves in such a direction as to decrease the amount of shielding of the reflected light, the second shade moves in such a direction as to increase the amount of shielding of the reflected light, and the lighting unit is tilted downward, as compared with a normal travel.

Moreover, it is more preferable that, when the vehicle is in the rain travel, the first shade moves in such a direction as to decrease the amount of shielding of the reflected light, the second shade moves in such a direction as to increase the amount of shielding of the reflected light, as compared with the high-speed travel.

Further, the first shade and the second shade can be moved by a common shade driving mechanism.

As shown in the structure, the headlamp for a vehicle according to the invention is constituted to form the light distribution pattern having the cutoff line on the upper end by the projector type lighting unit comprising the shade. The shade includes the first shade for forming the cutoff line and the second shade for forming the dark portion in the central part on the lower end of the light distribution pattern. Each of the first and second shades is constituted to be moved corresponding to the vehicle traveling situation, thereby changing the amount of shielding of the light reflected from the reflector, and furthermore, the lighting unit is constituted to be tilted in the vertical direction interlockingly with the movement of the first or second shade corresponding to the vehicle traveling situation. Consequently, it is possible to obtain the following functions and advantages.

More specifically, the first shade is properly moved to vertically shift the position of the cutoff line of the light distribution pattern, and furthermore, the lighting unit is properly tilted in the vertical direction to displace the whole light distribution pattern in the vertical direction. Consequently, a light irradiation can be carried out with a light distribution pattern at an irradiation angle corresponding to the vehicle traveling situation. Thus, it is possible to enhance the visibility of a road surface in the forward portion of the vehicle. In addition, in that case, the second shade is properly moved to form the dark portion in the central part on the lower end of the light distribution pattern in a predetermined size if necessary. Consequently, it is also possible to finely control the amount of the light irradiation on the short-distance region of the road surface in the forward portion of the vehicle. Thus, it is possible to prevent a distant road surface from being seen with difficulty due to a road surface on this side which is too bright in a high-speed travel, and furthermore, to prevent the generation of a light reflected by a road surface which gives a glare to the driver of a car traveling in an opposite direction in a rain travel, for example.

According to the invention, thus, it is possible to carry out a light irradiation with a light distribution pattern at an irradiation angle corresponding to a vehicle traveling situation, and furthermore, to finely control the amount of the light irradiation on the short-distance region of the road surface in the forward portion of the vehicle in a headlamp for a vehicle which is constituted to form a light distribution pattern having a cutoff line on an upper end by a projector type lighting unit.

In the structure, if the first shade is constituted to be moved in such a direction as to decrease the amount of shielding of the reflected light and the second shade is constituted to be moved in such a direction as to increase the amount of shielding of the reflected light, and the lighting unit is constituted to be tilted upward in a high-speed travel as compared with a normal travel, it is possible to obtain the following functions and advantages.

More specifically, the first shade is moved in such a direction as to decrease the amount of shielding of the reflected light, thereby upward shifting the position of the cutoff line to enlarge the light distribution pattern toward the upper end side. Consequently, the amount of the light irradiation can be increased, and furthermore, a hot zone to be a region having a high luminous intensity of the light distribution pattern is enlarged upward so that the visibility of a long-distance region on the road surface in the forward portion of the vehicle can be enhanced. In that case, it is possible to upward displace the light distribution pattern together with the hot zone thereof by upward tilting the lighting unit. Consequently, the visibility of the long-distance region on the road surface in the forward portion of the vehicle can be enhanced still more. In that case, furthermore, the second shade is moved in such a direction as to increase the amount of shielding of the reflected light. Consequently, the dark portion can be formed in the central part on the lower end of the light distribution pattern. Therefore, it is possible to prevent the road surface on this side from becoming too bright in the high-speed travel. Thus, the visibility of the long-distance region on the road surface in the forward portion of the vehicle can be enhanced still more.

In the structure, moreover, if the first shade is constituted to be moved in such a direction as to decrease the amount of shielding of the reflected light and the second shade is constituted to be moved in such a direction as to increase the amount of shielding of the reflected light, and the lighting unit is constituted to be tilted downward in a rain travel as compared with the normal travel, it is possible to obtain the following functions and advantages.

More specifically, most of the light irradiated on the road surface in the forward portion of the vehicle is regularly reflected so that a retroreflected light is lessened in the rain travel. In order to maintain the visibility of the road surface in the forward portion of the vehicle, therefore, it is desirable that the amount of the light irradiation should be maintained to be as large as possible. From this viewpoint, if the first shade is moved in such a direction as to decrease the amount of shielding of the reflected light, the position of the cutoff line can be moved upward to enlarge the light distribution pattern toward the upper end side thereof. Thus, it is possible to increase the amount of the light irradiation. In that case, it is possible to prevent the positions of the cutoff line and the hot zone from being changed more greatly than those in the normal travel by downward tilting the lighting unit. In that case, furthermore, the second shade is moved in such a direction as to increase the amount of shielding of the reflected light. Consequently, it is possible to form the dark portion in the central part on the lower end of the light distribution pattern. Thus, it is possible to suppress the generation of the light reflected from the road surface which gives a glare to the driver of a car traveling in an opposite direction. At this time, the central part on the lower end of the light distribution pattern becomes the dark portion and both left and right side portions thereof do not become the dark portions. Consequently, it is possible to sufficiently maintain the visibility of a lane mark (that is, white lines on both left and right sides which are extended along the travel lane of a road).

In this case, if the first shade is constituted to be moved in such a direction as to decrease the amount of shielding of the reflected light and the second shade is constituted to be moved in such a direction as to increase the amount of shielding of the reflected light in the rain travel as compared with the high-speed travel, it is possible to obtain the following functions and advantages.

More specifically, when the first shade is moved in such a direction as to decrease the amount of shielding of the reflected light as compared with that in the high-speed travel, the amount of the light irradiation can be increased still more. Therefore, the visibility of the road surface in the forward portion of the vehicle in the rain travel can be enhanced still more. In that case, when the second shade is moved in such a direction as to increase the amount of shielding of the reflected light as compared with that in the high-speed travel, a large dark portion can be formed in the central part on the lower end of the light distribution pattern. Consequently, it is possible to more effectively suppress a glare to be given to the driver of a car traveling in an opposite direction by a light reflected from the road surface in the rain travel.

While the movements of the first and second shades may be carried out by separate shade driving mechanisms in the structure, it is also possible to employ such a structure as to carry out the movements of the first and second shades by a common shade driving mechanism. Thus, it is possible to obtain the functions and advantages at a low cost with a simple structure.

DETAILED DESCRIPTION OF THE PREFERRED EMBODIMENTS

An embodiment of the invention will be described below with reference to the drawings.

Figure 1:
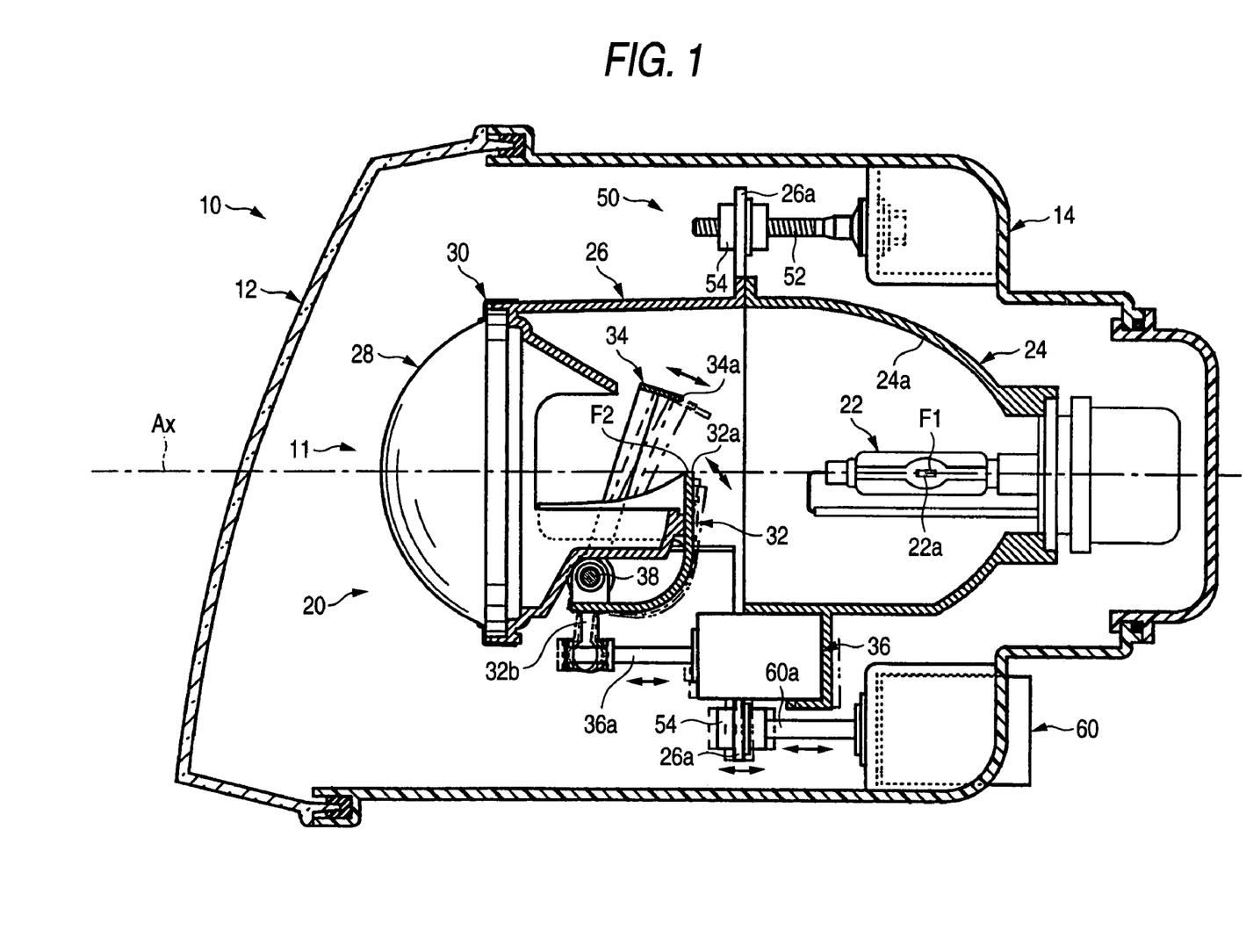
FIG. 1 is a sectional side view showing a headlamp for a vehicle according to an embodiment of the invention.
Figure 2:
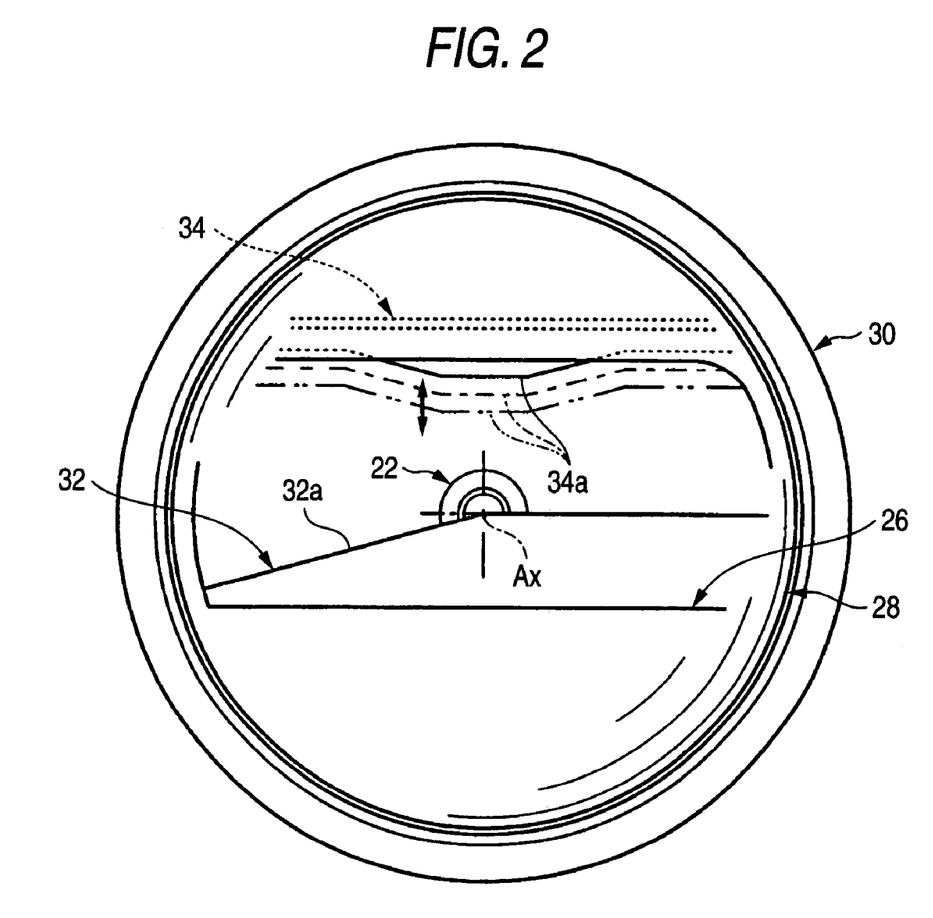
FIG. 2 is a detailed view seen in a II direction of FIG. 1.

FIG. 1 is a sectional side view showing a headlamp for a vehicle according to an embodiment of the invention and FIG. 2 is a detailed view seen in a II direction of FIG. 1.

As shown in these drawings, in a headlamp 10 for a vehicle according to the embodiment, a lighting unit 20 having an optical axis Ax extended in the longitudinal direction of the vehicle is accommodated tiltably in a vertical direction and a transverse direction through an aiming mechanism 50 in a lamp housing formed by a transparent cover 12 and a lamp body 14.

The aiming mechanism 50 is constituted by coupling a bracket 26a of the lighting unit 20 through an aiming nut 54 to an aiming screw 52 attached rotatably to a plurality of portions of the lamp body 14 (one of the portions is an output shaft 60a of a leveling mechanism 60 which will be described below), and the aiming adjustment of the lighting unit 20 is carried out by the aiming mechanism 50. In a state in which the aiming adjustment is completed, the optical axis Ax of the lamp body 14 is extended in a downward direction at an angle of approximately 0.5 to 0.6 degree with respect to the longitudinal direction of the vehicle.

The leveling mechanism 60 for tilting the lighting unit 20 in a vertical direction corresponding to a vehicle traveling situation is provided in an aiming fulcrum position in the vertical direction of the aiming mechanism 50. The leveling mechanism 60 is constituted by a motor including the output shaft 60a extended in the longitudinal direction. The output shaft 60a is moved in the longitudinal direction to tilt the lighting unit 20 in the vertical direction from an initial adjustment position around an aiming acting point in the vertical direction in the aiming mechanism 50.

Figure 3:
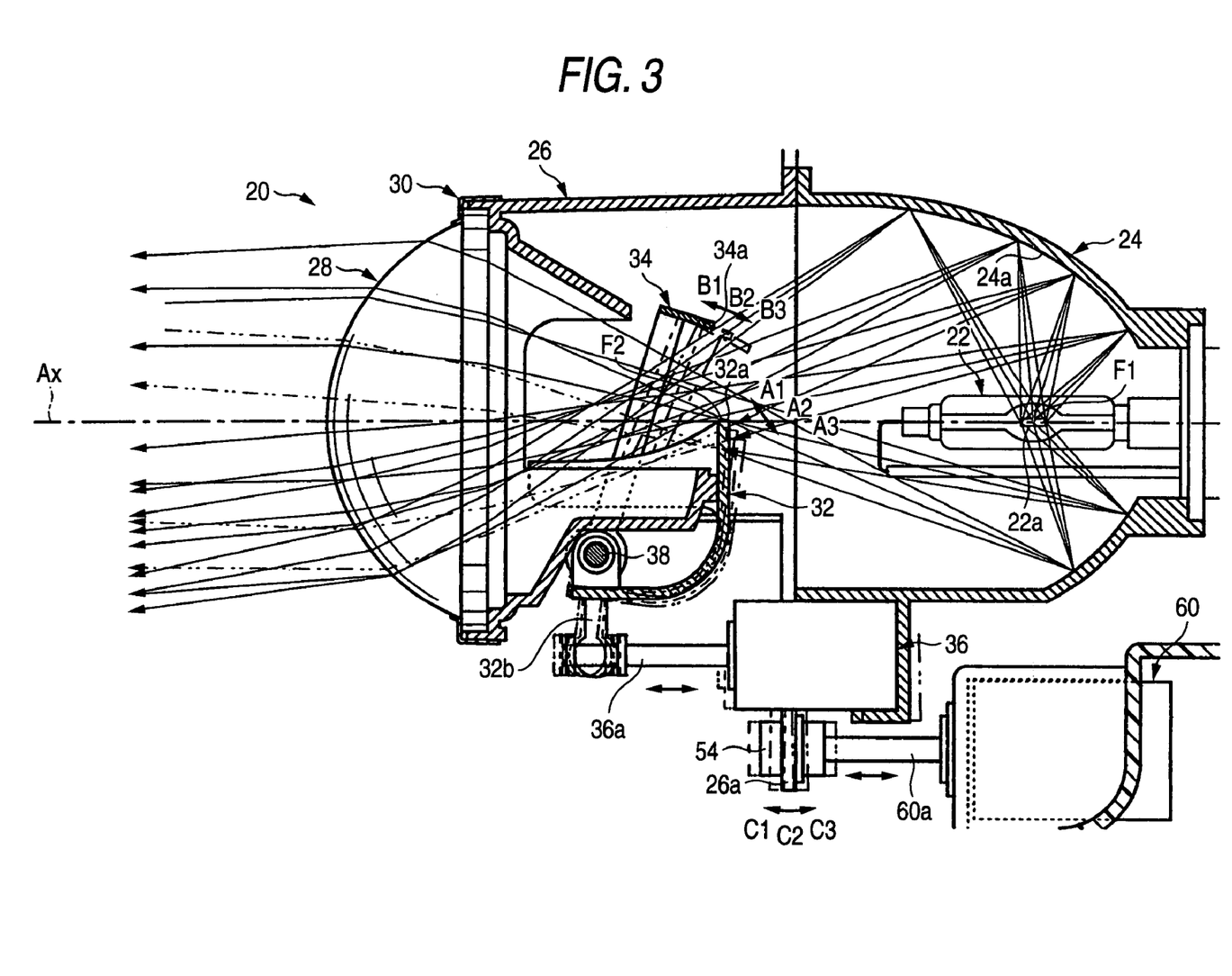
FIG. 3 is a detailed view showing a main part in FIG. 1.

FIG. 3 is a detailed view showing a main part in FIG. 1.

As shown in FIG. 3, similarly, the lighting unit 20 is of a projector type and comprises a discharge bulb 22, a reflector 24, a holder 26, a projection lens 28, a retaining ring 30, a first shade 32, a second shade 34 and a shade driving mechanism 36.

The discharge bulb 22 is a metal halide bulb and a light source 22a constituted by a discharge light emitting section thereof is attached to the reflector 24 so as to be provided coaxially with the optical axis Ax over the optical axis Ax.

The reflector 24 has a reflecting plane 24a taking the shape of an almost ellipse and sphere setting the optical axis Ax to be a central axis. In the reflecting plane 24a, a sectional shape including the optical axis Ax is set to be an almost elliptical shape setting the central position of the light source 22a to be a first focal point F1. The reflecting plane 24a serves to collect and reflect a light emitted from the light source 22a forward close to the optical axis Ax. The eccentricity of the reflecting plane 24a is set to be gradually increased from a vertical section toward a horizontal section.

The holder 26 is formed to be extended almost cylindrically and forward from an opening portion on the front end of the reflector 24, and fixes and supports the reflector 24 at a rear end thereof. The holder 26 fixes and supports the projection lens 28 through the retaining ring 30 at a front end thereof and arranges the projection lens 28 on the optical axis Ax.

The projection lens 28 is constituted by a plano-convex lens having a surface on a front side to be convex and a surface on a rear side to be flat, and the image of the light source 22a which is formed on a focal plane at the rear side including a focal point F2 on the rear side is forward projected as an inverted image.

The first and second shades 32 and 34 are rotatably supported on the holder 26 in the internal space of the holder 26.

The first shade 32 is provided to be positioned in an almost lower half part in the internal space of the holder 26, and is rotatably supported on the holder 26 through a rotating pin 38 extended in a transverse direction. The first shade 32 can take a first rotating position A1 to be a reference position, a second rotating position A2 rotated slightly toward a rear side from the first rotating position A1, and a third rotating position A3 rotated further slightly toward the rear side from the second rotating position A2. In FIG. 3, a position shown in a solid line indicates the first rotating position A1, a position shown in a one-dotted chain line indicates the second rotating position A2, and a position shown in a two-dotted chain line indicates the third rotating position A3.

When the first shade 32 is placed in the first rotating position A1, it is provided in such a manner that an upper edge 32a passes through the focal point F2 on the rear side of the projection lens 28. Consequently, a part of a light reflected from the reflecting plane 24a of the reflector 24 is shielded so that most of an upward light emitted forward from the projection lens 28 is removed. When the first shade 32 is rotated from the first rotating position A1 toward the rear side, that is, to the second rotating position A2 and the third rotating position A3, the upper edge 32a is displaced obliquely and downward so that the amount of shielding for the light reflected from the reflecting plane 24a is decreased.

The second shade 34 is formed to be protruded like a tab rearward, obliquely and downward in a portion provided above the first shade 32 in the internal space of the holder 26, and is rotatably supported on the holder 26 through the rotating pin 38 in leg portions at both left and right sides. In that case, the second shade 34 is rotated together with the first shade 32. The second shade 34 can take a first rotating position B1 to be a reference position, a second rotating position B2 rotated slightly toward a rear side from the first rotating position B1, and a third rotating position B3 rotated further slightly toward the rear side from the second rotating position B2. In FIG. 3, a position shown in a solid line indicates the first rotating position B1, a position shown in a one-dotted chain line indicates the second rotating position B2, and a position shown in a two-dotted chain line indicates the third rotating position B3.

When the second shade 34 is placed in the first rotating position B1, a rear edge 34a is provided in such a position as to rarely shield the light reflected from the reflecting plane 24a of the reflector 24 above the focal point F2 on the rear side of the projection lens 28. When the second shade 34 is rotated from the first rotating position B1 toward the rear side, that is, to the second rotating position B2 and the third rotating position B3, the rear edge 34a protruded rearward, obliquely and downward is displaced obliquely and downward so that the light reflected from the reflecting plane 24a is shielded and the amount of shielding for the reflected light is increased.

The shade driving mechanism 36 is constituted by a motor including an output shaft 36a extended in a longitudinal direction. The output shaft 36a of the shade driving mechanism 36 is engaged with a stay 32b formed to be protruded downward from the first shade 32 at a tip portion thereof. Consequently, a reciprocation in the longitudinal direction of the output shaft 36a is transmitted as the rotation of the first and second shades 32 and 34. The shade driving mechanism 36 moves the output shaft 36a in the longitudinal direction based on a control signal input corresponding to a vehicle traveling situation. Consequently, the first and second shades 32 and 34 are rotated in any of the first to third rotating positions B1 to B3.

On the other hand, the leveling mechanism 60 moves the output shaft 60a in the longitudinal direction based on the control signal input corresponding to the vehicle traveling situation. Consequently, the lighting unit 20 is tilted to any of a first tilting position C1 tilted slightly upward from an initial adjusting position, a second tilting position C2 to be the initial adjusting position and a third tilting position C3 tilted slightly downward from the initial adjusting position.

Figure 4:
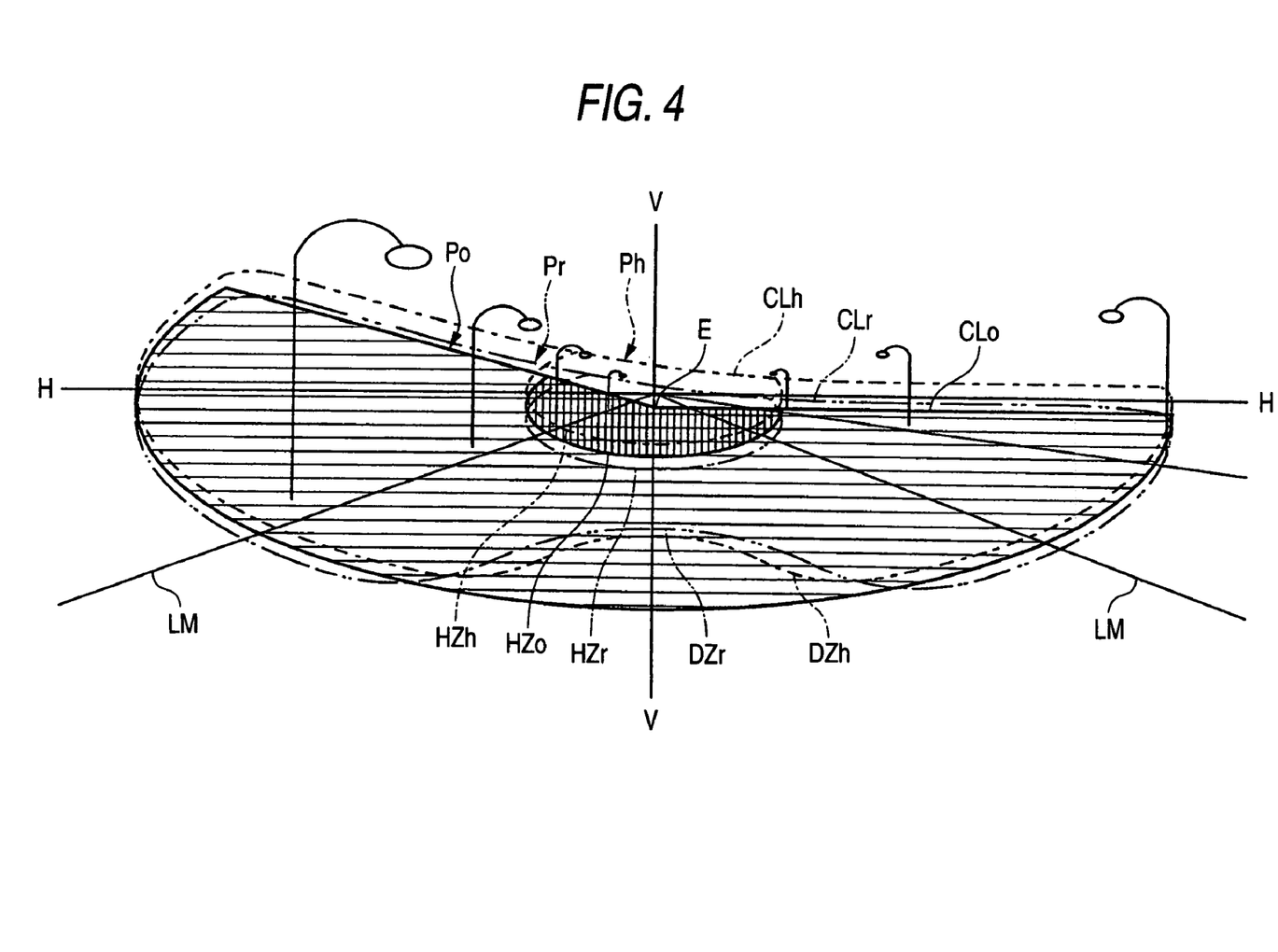
FIG. 4 is a perspective view showing three types of light distribution patterns formed on a virtual vertical screen provided in a forward position of 25 m from a lighting unit by a light irradiated forward from the lighting unit of the headlamp for a vehicle.

FIG. 4 is a perspective view showing a light distribution pattern formed on a virtual vertical screen arranged in a forward position of 25 m from the lighting unit 20 by a light irradiated forward from the lighting unit 20.

In FIG. 4, a light distribution pattern Po shown in a solid line is a light distribution pattern in a normal traveling mode. In FIG. 4, a light distribution pattern Ph shown in a one-dotted chain line is a light distribution pattern in a high-speed traveling mode. In FIG. 4, a light distribution pattern Pr shown in a two-dotted chain line is a light distribution pattern in a rain traveling mode. The normal traveling mode is selected in a normal travel in which a vehicle travels at low and middle vehicle speeds (which are less than 60 km/h, for example), the high-speed traveling mode is selected in a high-speed travel in which the vehicle travels at a high vehicle speed (which is equal to or higher than 60 km/h, for example), and the rain traveling mode is selected in a rain travel.

Figure 5:
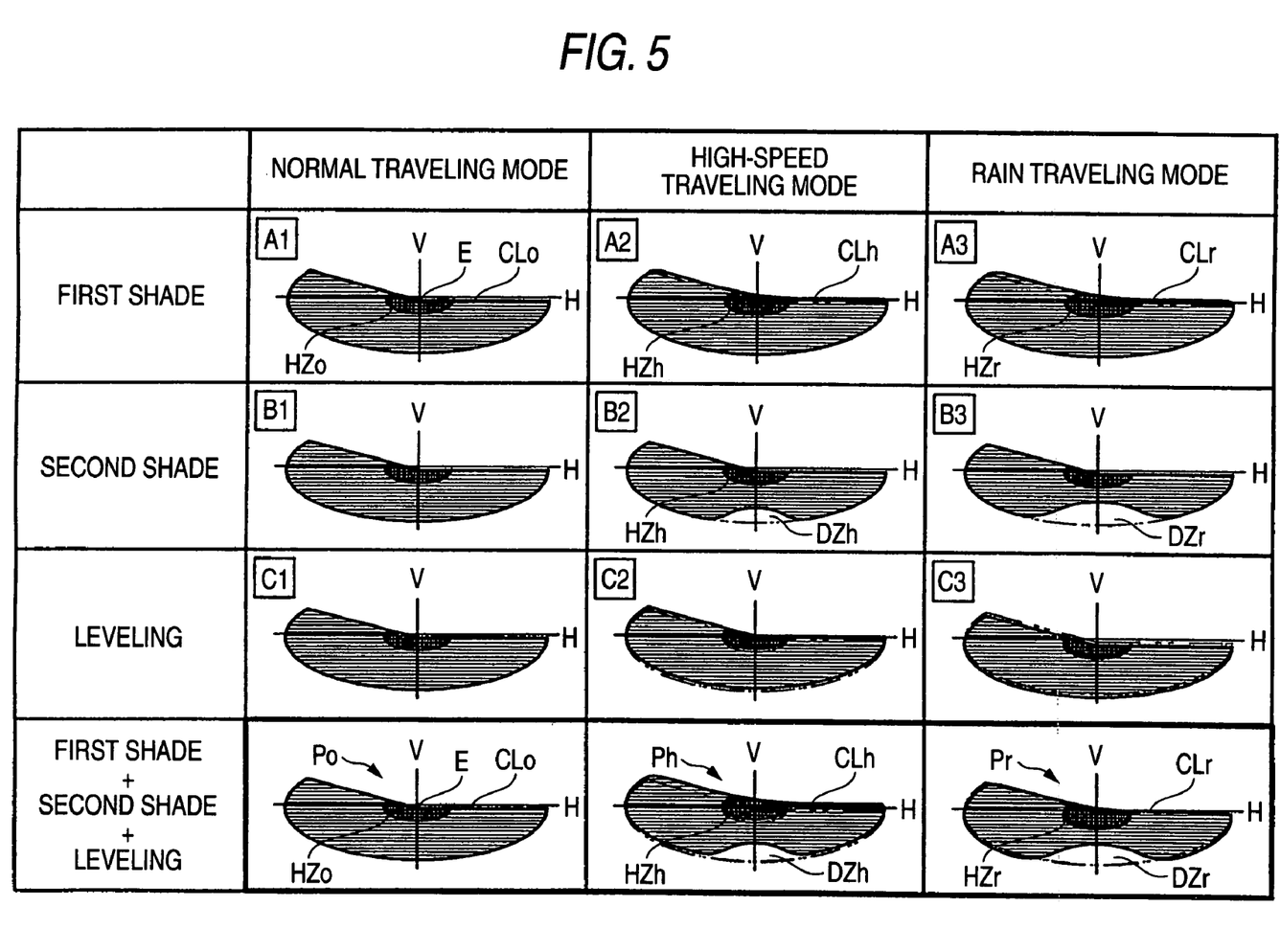
FIG. 5 is a table showing a process for forming the three types of light distribution patterns.

FIG. 5 is a table showing a process for forming each of the light distribution patterns Po, Ph and Pr.

The light distribution pattern Po in the normal traveling mode is formed when the first and second shades 32 and 34 are placed in the first rotating positions A1 and B1 and the lighting unit 20 is placed in the second tilting position C2. The light distribution pattern Ph in the high-speed traveling mode is formed when the first and second shades 32 and 34 are placed in the second rotating positions A2 and B2 and the lighting unit 20 is placed in the first tilting position C1. The light distribution pattern Pr in the rain traveling mode is formed when the first and second shades 32 and 34 are placed in the third rotating positions A3 and B3 and the lighting unit 20 is placed in the third tilting position C3.

As shown in FIGS. 4 and 5, the light distribution pattern Po in the normal traveling mode is a light distribution pattern for a low beam to give a left light distribution which has a clear cutoff line CLo on an upper end thereof, and has a hot zone HZo to be a region-having a high luminous intensity in the central part of the upper end. In the cutoff line CLo, an opposite lane side is formed as a horizontal cutoff line and a self-lane side is formed as an oblique cutoff line, and the position of an elbow point E to be an intersection thereof is set to be a slightly lower position of a vanishing point H-V in the front direction of the lighting unit (more specifically, a lower position at approximately 0.5 to 0.6 degree).

The light distribution pattern Ph in the high-speed traveling mode is obtained by slightly deforming the light distribution pattern Po.

More specifically, a cutoff line CLh of the light distribution pattern Ph is displaced upward with respect to the cutoff line CLo and a visibility thereof is slightly low. Thus, the position of the cutoff line CLh is moved upward because the first shade 32 is rotated rearward, obliquely and downward from the first rotating position A1 to the second rotating position A2 and the amount of shielding of a reflected light is reduced. In that case, the visibility of the cutoff line CLh is deteriorated because the upper edge 32a is shifted from a focal plane on the rear side of the projection lens 28 by the rotation of the first shade 32.

Moreover, a hot zone HZh of the light distribution pattern Ph is displaced upward with respect to the hot zone HZo and has a greater vertical width than the hot zone HZo. Thus, the hot zone HZh is displaced upward because the lighting unit 20 is tilted upward from the second tilting position C2 to the first tilting position C1 to displace the whole light distribution pattern Ph upward. The vertical width of the hot zone HZh is increased because the position of the cutoff line CLh is moved upward.

Furthermore, a dark portion DZh is formed in a central part on the lower end of the light distribution pattern Ph. Thus, the dark portion DZh which is not present in the light distribution pattern Po is formed because the second shade 34 is rotated rearward, obliquely and downward from the first rotating position B1 to the second rotating position B2 to shield a part of a light reflected from the reflecting plane 24a of the reflector 24.

The position of the cutoff line CLh is moved upward with respect to the cutoff line CLo so that the light distribution pattern Ph is enlarged toward the upper end side with respect to the light distribution pattern Po. Consequently, it is possible to increase the amount of a light irradiation. In general, a distance from a forward traveling car is sufficiently long in a high-speed travel. Even if the position of the cutoff line CLh is moved slightly upward with respect to the cutoff line CLo, therefore, a great glare is not given to the driver of the forward traveling car. Moreover, the light distribution pattern Ph has the hot zone HZh enlarged upward with respect to the hot zone HZo. Therefore, it is possible to enhance the visibility of a long-distance region on a road surface in the forward portion of a vehicle. In addition, the whole light distribution pattern Ph is displaced upward with respect to the light distribution pattern Po. Consequently, the hot zone HZh is also displaced upward with respect to the hot zone HZo. Thus, the visibility of the long-distance region on the road surface in the forward portion of the vehicle can be enhanced still more. More specifically, the visual point of a self-car driver is also shifted to a distant region with the upward displacement of the hot zone HZh. Consequently, the light distribution pattern Ph can be set to be suitable for the high-speed travel. Furthermore, the light distribution pattern Ph has the dark portion DZh formed in the central part on the lower end. Therefore, it is possible to prevent a road surface on this side from becoming too bright in the high-speed travel. Thus, the visibility of the long-distance region on the road surface in the forward portion of the vehicle can be enhanced still more.

The light distribution pattern Pr in the rain traveling mode is obtained by further deforming the light distribution pattern Po.

More specifically, a cutoff line CLr of the light distribution pattern Pr is displaced slightly upward with respect to the cutoff line CLo and a visibility thereof is further lower than that of the cutoff line CLh. Thus, the position of the cutoff line CLh is moved slightly upward because the first shade 32 is rotated rearward, obliquely and downward to the third rotating position A3 and the amount of shielding of a reflected light is reduced still more, and the lighting unit 20 is tilted downward to the third tilting position C3 to display the light distribution pattern Pr downward. In that case, the visibility of the cutoff line CLr is more deteriorated because the upper edge 32a is further shifted from a focal plane on the rear side of the projection lens 28 by the rotation of the first shade 32.

Moreover, a hot zone HZr of the light distribution pattern Pr is formed in almost the same position as that of the hot zone HZo and has a greater vertical width than the hot zone HZo. Thus, the vertical width of the hot zone HZr is increased because the position of the cutoff line CLr is moved upward. The hot zone HZr is formed in almost the same position as the hot zone HZo because the lighting unit 20 is tilted downward to the third tilting position C3.

Furthermore, a larger dark portion DZr than the dark portion DZh is formed in the central part on the lower end of the light distribution pattern Ph. Thus, the larger dark portion DZr than the dark portion DZh is formed because the second shade 34 is rotated rearward, obliquely and downward from the first rotating position B1 to the third rotating position B3 to shield a larger amount of the light reflected from the reflecting plane 24a of the reflector 24.

The light distribution pattern Pr is further enlarged toward the upper end side with respect to the light distribution pattern Ph. Therefore, the amount of the light irradiation can be increased still more. Consequently, the visibility of the road surface in the forward portion of the vehicle in the rain travel can be enhanced still more. Moreover, the hot zone HZr is also enlarged downward. Therefore, it is possible to increase the amount of the light irradiation on the middle-distance region of the road surface in the forward portion of the vehicle. Consequently, it is possible to increase the illuminance of the road surface in the vicinity of a forward portion of 30m from the vehicle, thereby enhancing the visibility of a lane mark LM on both sides of a traveling lane. In that case, the cutoff line CLr is only displaced slightly upward with respect to the cutoff line CLo. In addition, the visibility is more deteriorated than that of the cutoff line CLh. Therefore, a great glare can be prevented from being given to the driver of the forward traveling car.

Moreover, the light distribution pattern Pr has the dark portion DZr formed in the central part on the lower end. Therefore, it is possible to suppress the generation of a light reflected by the road surface which gives a glare to the driver of a car traveling in an opposite direction. In addition, the dark portion DZr is formed over a wider range than the dark portion DZh. Consequently, the generation of the light reflected by the road surface can be suppressed still more effectively. At this time, the central part of the lower end of the light distribution pattern Pr acts as the dark portion DZr and both left and right side portions do not become the dark portions. Therefore, it is possible to sufficiently maintain the visibility of the lane mark LM on both sides of the traveling lane.

As described above in detail, according to the embodiment, a light irradiation can be carried out with a light distribution pattern at an irradiation angle corresponding to a vehicle traveling situation, and furthermore, the amount of the light irradiation on the short-distance region of the road surface in the forward portion of a vehicle can also be controlled finely.

In the embodiment, moreover, the first and second shades 32 and 34 are moved by the common shade driving mechanism 36. Consequently, the functions and advantages can be obtained at a low cost with a simple structure.

While the first shade 32 is moved in such a direction as to decrease the amount of shielding of a reflected light and the second shade 34 is moved in such a direction as to increase the amount of shielding of the reflected light in the rain travel as compared with the high-speed travel in the embodiment, the amounts of shielding of the reflected light in the first and second shades 32 and 34 can also be set to have equal values in the rain travel and the high-speed travel. Also in such a case, it is possible to prevent a distant road surface from being seen with difficulty due to a road surface on this side which becomes too bright in the high-speed travel, and furthermore, to suppress the generation of the light reflected by the road surface which gives a glare to the driver of a car traveling in an opposite direction in the rain travel.

While the first and second shades 32 and 34 are constituted separately in the embodiment, moreover, it is also possible to constitute them integrally.

What is claimed is:

1. A headlamp for a vehicle comprising:
    a lighting unit including:
        a light source disposed on a vicinity of an optical axis extended in a longitudinal direction of the vehicle;
        a reflector for collecting a light emitted from the light source and reflecting the collected light forward close to the optical axis; and
        a shade disposed in front of the reflector for shielding a part of a light reflected from the reflector, wherein a cutoff line is formed in a light distribution pattern on an upper end,
    wherein the shade includes: a first shade for forming the cutoff line; and a second shade for forming a dark portion in a central part on a lower end of the light distribution pattern,
    the first shade moves to change an amount of shielding of the reflected light by the first shade according to a vehicle traveling situation, and the second shade moves to change an amount of shielding of the reflected light by the second shade according to the vehicle traveling situation, and
    the lighting unit is tilted in a vertical direction interlockingly with the movement of at least one of the first and second shade according to the vehicle traveling situation.

2. The headlamp according to claim 1, wherein the lighting unit further includes a projection lens disposed in front of the reflector, and
    the shade is disposed between the reflector and the projection lens.

3. The headlamp according to claim 1, wherein the whole light distribution pattern is displaced in the vertical direction when the lighting unit is tilted in the vertical direction.

4. The headlamp according to claim 1, wherein, in a high-speed travel, the first shade moves in such a direction as to decrease the amount of shielding of the reflected light, the second shade moves in such a direction as to increase the amount of shielding of the reflected light, and the lighting unit is tilted upward, as compared with a normal travel.

5. The headlamp according to claim 1, wherein, in a rain travel, the first shade moves in such a direction as to decrease the amount of shielding of the reflected light, the second shade moves in such a direction as to increase the amount of shielding of the reflected light, and the lighting unit is tilted downward, as compared with a normal travel.

6. The headlamp according to claim 5, wherein, in the rain travel, the first shade moves in such a direction as to decrease the amount of shielding of the reflected light, the second shade moves in such a direction as to increase the amount of shielding of the reflected light, as compared with the high-speed travel.

7. The headlamp according to claim 4, wherein, in a rain travel, the first shade moves in such a direction as to decrease the amount of shielding of the reflected light, the second shade moves in such a direction as to increase the amount of shielding of the reflected light, and the lighting unit is tilted downward, as compared with a normal travel.

8. The headlamp according to claim 7, wherein, in the rain travel, the first shade moves in such a direction as to decrease the amount of shielding of the reflected light, the second shade moves in such a direction as to increase the amount of shielding of the reflected light, as compared with the high-speed travel.

9. The headlamp according to claim 1, wherein the first shade and the second shade are moved by a common shade driving mechanism.

* * * * *